(12) United States Patent
Wu et al.

(10) Patent No.: US 11,215,733 B2
(45) Date of Patent: Jan. 4, 2022

(54) METHODS TO CONFIGURE A DOWNHOLE ELECTROMAGNETIC TOOL AND DOWNHOLE ELECTROMAGNETIC TOOL CALIBRATION SYSTEMS

(71) Applicant: Halliburton Energy Services, Inc., Houston, TX (US)

(72) Inventors: Hsu-Hsiang Wu, Sugar Land, TX (US); Jin Ma, Houston, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 90 days.

(21) Appl. No.: 16/693,038

(22) Filed: Nov. 22, 2019

(65) Prior Publication Data

US 2021/0157027 A1    May 27, 2021

(51) Int. Cl.
*G01V 13/00* (2006.01)
*G01V 3/20* (2006.01)

(52) U.S. Cl.
CPC ............. *G01V 13/00* (2013.01); *G01V 3/20* (2013.01)

(58) Field of Classification Search
CPC ................................. G01V 13/00; G01V 3/20
See application file for complete search history.

(56) References Cited

U.S. PATENT DOCUMENTS

| | | | | |
|---|---|---|---|---|
| 2015/0241596 A1* | 8/2015 | Donderici | ............... | G01V 13/00 324/338 |
| 2018/0106763 A1* | 4/2018 | Fouda | ..................... | E21B 47/00 |
| 2019/0078430 A1 | 3/2019 | Fouda et al. | | |

FOREIGN PATENT DOCUMENTS

| | | | | |
|---|---|---|---|---|
| EP | 2815070 B1 | 8/2016 | | |
| WO | WO-9524663 A1 * | 9/1995 | ............... | G01V 3/30 |
| WO | 2017074295 A1 | 5/2017 | | |
| WO | WO-2017074295 A1 * | 5/2017 | ............... | G01V 3/28 |
| WO | WO-2018063162 A1 * | 4/2018 | ............... | G01V 3/30 |
| WO | WO-2019017957 A1 * | 1/2019 | ............. | E21B 47/00 |

OTHER PUBLICATIONS

International Search Report and Written Opinion issued in corresponding PCT International Patent Application No. PCT/US2019/063743; dated Aug. 20, 2020.

\* cited by examiner

*Primary Examiner* — Natalie Huls
*Assistant Examiner* — Michael J Singletary
(74) *Attorney, Agent, or Firm* — McGuireWoods LLP

(57) ABSTRACT

Methods to configure a downhole electromagnetic tool and downhole electromagnetic tool calibration systems are disclosed. A method to configure a downhole electromagnetic tool includes obtaining a first calibration measurement of a first tool configuration and a second calibration measurement of a second tool configuration of a downhole electromagnetic tool, and determining a first ratio of the first calibration to the second calibration. The method further includes obtaining a first synthetic response of the first tool configuration from a first model of the downhole electromagnetic tool, and obtaining a second synthetic response of the second tool configuration from a second model of the downhole electromagnetic tool, and determining a second ratio of the first synthetic response to the second synthetic response. The method further includes determining a scaling factor between the first tool configuration and the second tool configuration of the downhole electromagnetic tool based on the first and second ratios.

15 Claims, 8 Drawing Sheets

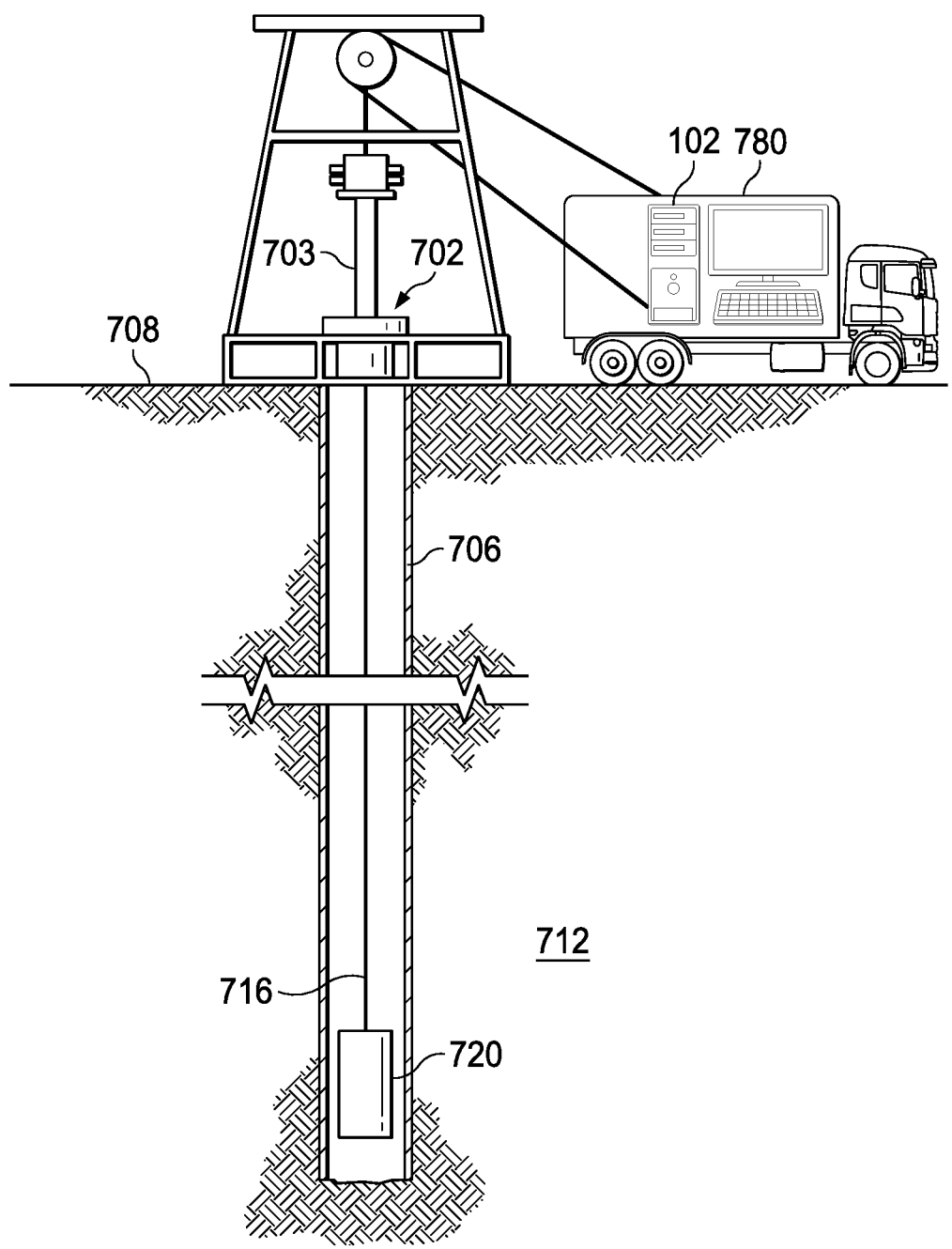

METHODS TO CONFIGURE A DOWNHOLE ELECTROMAGNETIC TOOL AND DOWNHOLE ELECTROMAGNETIC TOOL CALIBRATION SYSTEMS

BACKGROUND

The present disclosure relates generally to methods to configure a downhole electromagnetic tool and downhole electromagnetic tool calibration systems.

Some resistivity tools utilize collocated transmitters and receivers. Certain calibration techniques assume that the coils of collated transmitters have identical dimensions, and thereby have identical effective dipole moments and orientation. However, the dimension of each coil is different from the dimension of other coils, which cause different antennas to have different effective dipole moments and orientations. It is sometimes difficult to decouple multiple-component measurements from the collocated transmitters and receivers without obtaining accurate effective dipole moments and orientations of the transmitters and receivers.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

FIG. 7A is a schematic, side view of a wireline environment with a downhole electromagnetic tool similar to the downhole electromagnetic tool of FIG. 1 and deployed in a borehole to measure properties of the surrounding formation.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Figure 1:
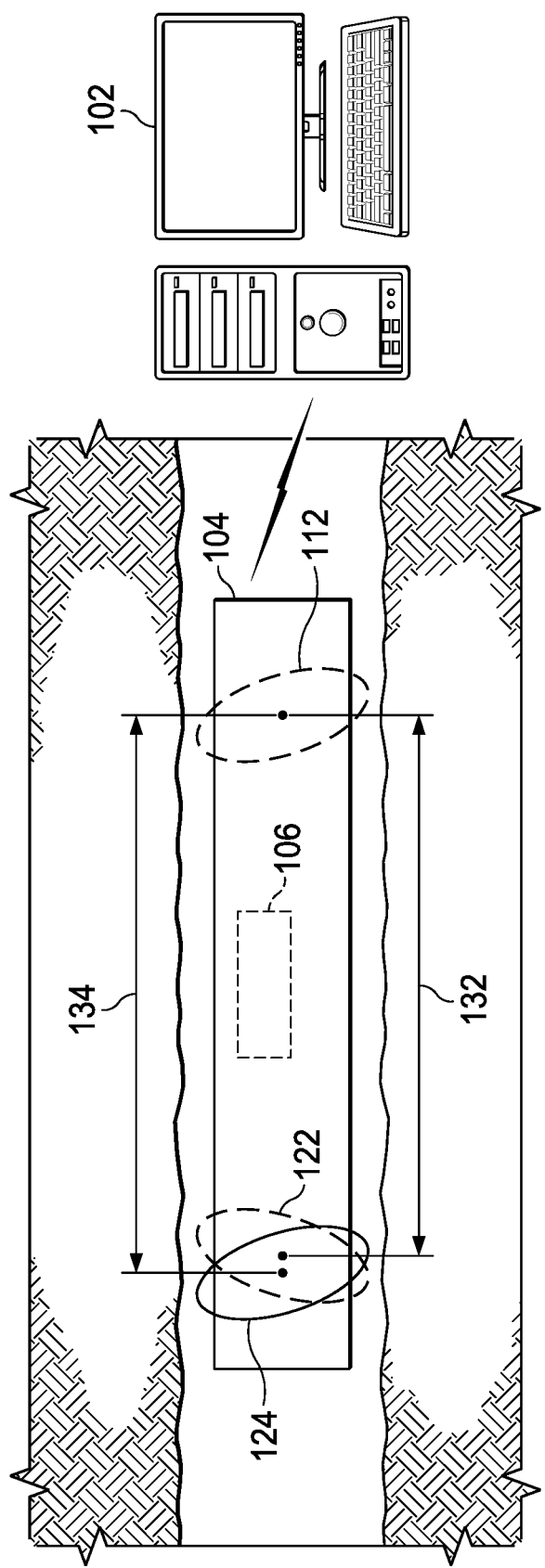
FIG. 1 illustrates a downhole electromagnetic tool calibration system configured to calibrate a downhole electromagnetic tool having a transmitter and two collocated receivers.

The present disclosure relates to methods to configure a downhole electromagnetic tool and downhole electromagnetic tool calibration systems. As referred to herein, a downhole electromagnetic tool is any tool or device having one or more transmitters and one or more receivers and is deployable in a downhole environment, such as a wellbore of a hydrocarbon well. In some embodiments, collocated transmitters and collocated receivers are coupled to the downhole electromagnetic tool and are used to transmit signals to other tools and devices, receive signals from other tools and devices, simultaneously transmit and receive signals (where the transmitter or the receiver is a transceiver) to and from other tool and devices, or alternatively transmit and receive signals to and from other tools and devices. FIG. 1, for example, illustrates a downhole electromagnetic tool having one transmitter and two collocated receivers. In some embodiments, the downhole electromagnetic tool has a different number of transmitters or a different number of receivers coupled to the downhole electromagnetic tool.

The method includes obtaining a first calibration measurement of a first tool configuration of the downhole electromagnetic tool and obtaining a second calibration measurement of a second tool configuration of the downhole electromagnetic tool. As referred to herein, a tool configuration refers to the configuration of a transmitter and a receiver of the downhole electromagnetic tool. Further, a calibration measurement refers to a measurement of a transmitter-receiver spacing ("T-R" spacing) between the transmitter and the receiver, where the T-R spacing is the distance between the transmitter and the receiver. In some embodiments, the T-R spacing is the distance between the center of the transmitter antenna coils and the center of the receiver antenna coils. In some embodiments, where the downhole electromagnetic tool has multiple collocated transmitters or multiple collocated receivers, the T-R spacing between a transmitter of the collocated transmitters and a receiver of the collocated receivers is the distance between the center of the respective transmitter and the respective receiver. In some embodiments, the first and the second calibration measurements are performed while the downhole electromagnetic tool is deployed in different environments. For example, the first calibration measurement is performed while the downhole el electromagnetic tool is deployed in a gas chamber that is filled with a gas, and the second calibration measurement is performed while the downhole electromagnetic tool is deployed in a liquid tank. Additional details of obtaining calibrations of the downhole electromagnetic tool in different environments are provided in the paragraphs below and are illustrated in at least FIG. 4.

In some embodiments, the first and the second calibration measurements are performed at different frequencies. For example, the first calibration measurement is performed at 10,000 Hz, whereas the second calibration measurement is performed at 15,000 Hz. Additional details of operating the downhole electromagnetic tool at different frequencies are provided in the paragraphs below and are illustrated in at least FIG. 5. In some embodiments, the first calibration measurement is the T-R spacing between a transmitter and a first receiver of multiple collocated receivers, and the second calibration measurement is the T-R spacing between the transmitter and a second receiver of the multiple collocated receivers. In some embodiments, the first calibration measurement is the T-R spacing between a first transmitter of multiple collocated transmitters and a receiver, and the second calibration measurement is the T-R spacing between a second transmitter of the multiple collocated transmitter and the receiver. Additional descriptions of obtaining calibration measurements of different collocated transmitters or receivers are provided in the paragraphs below and are illustrated in at least FIG. 6. A first ratio of the first calibration measurement to the second calibration measurement is obtained. In some embodiments, the ratio of the first calibration measurement and the second calibration measurement is the difference between the first calibration measurement and the second calibration measurement. In some embodiments, the ratio of the first calibration measurement and the second calibration measurement is equal to the first calibration measurement divided by the second calibration measurement.

A first synthetic response of the first tool configuration from a first model of the downhole electromagnetic tool and a second synthetic response of the second tool configuration from a second model of the downhole electromagnetic tool are obtained. A synthetic response is attained via analytic and/or numerical forward modeling calculations on the basis of a tool configuration with transmitting source and receiving positions and a background formation model surrounding the tool configuration. In some embodiments, the tool configuration is a simple antenna, such as a magnetic or electrical dipole antenna. In some embodiments, the tool configuration is a complex tool structure with physical geometry of the antennas. In some embodiments, the formation model is a homogenous medium with only one set of electrical properties (resistivity or conductive, permeability, permittivity, etc.) for the simulation space. In some embodiments, the formation model includes models with various and different sets of electrical properties in three-dimensional (3D) directions as a 3D formation model.

In some embodiments, a forward modeling is also used in an inversion process to invert a possible formation model that produced synthetic responses matching with actual tool measurements within certain threshold (typically called as misfit where is the difference between synthetic responses from the forward modeling and the tool measurements). In one or more of such embodiments, the determined possible formation is then calculated as an inverted formation model. In that regard, operations described herein to calibrate tool measurements are performed to reduce or eliminate the likelihood that the misfit calculation is biased by residual errors of the measurement calibrations. Examples of different models of the downhole electromagnetic tool include, but are not limited to, a dipole model of the downhole electromagnetic tool, a coil model of the downhole electromagnetic tool, and a three-dimensional antenna geometry model of the downhole electromagnetic tool.

A second ratio of the first synthetic response and the second synthetic response is obtained. In some embodiments, the ratio of the first synthetic response and the second synthetic response is the difference between the first synthetic response and the second synthetic response. In some embodiments, the ratio of the first synthetic response and the second synthetic response is equal to the first synthetic response divided by the second synthetic response.

A scaling factor between the first tool configuration and the second tool configuration of the downhole electromagnetic tool is determined based on the first ratio and the second ratio. In some embodiments, the scaling factor between the first tool configuration and the second tool configuration is the difference between the first ratio and the second ratio. Additional descriptions of determining the scaling factor are provided in the paragraphs below and are illustrated in at least FIGS. 3-6. In some embodiments, measurements of the downhole electromagnetic tool are calibrated based on the determined scaling factor. For example, where a scaling factor is calculated between two tool configurations where both tool configurations have the same transmitter antenna but each one has a different receiver antenna, the scaling factor determines the effective dipole difference between the two receiver antennas. In another embodiment, where the same tool configuration (for example one transmitter and one receiver) is used in two different surrounding environments (e.g., in air and in water), the scaling factor determines the calibration coefficient from one environment to the other environment for the same tool configuration. The foregoing allows operations to calibrate a tool at surface in two different environments and calculates a scaling factor for the tool. Further, one of the two environments is used as a reference environment to calibrate downhole measurements of the tool related to the reference environment. A similar approach using the same reference environment at surface as a reference model in the forward modeling is utilized in an inversion process such that the inverted formation model presents true formation properties based on the calibrated downhole measurements. Additional descriptions of methods to configure a downhole electromagnetic tool and downhole electromagnetic tool calibration systems are provided in the paragraphs below.

Turning now to the figures, FIG. 1 illustrates a downhole electromagnetic tool calibration system 102 configured to calibrate a downhole electromagnetic tool 104 having a transmitter 112 and two collocated receivers 122 and 124, respectively. Downhole electromagnetic tool calibration system 102 refers to any electronic device having one or more processors operable to perform the processes illustrated in FIGS. 3-6. In some embodiments, downhole electromagnetic tool calibration system 102 is a surface-based electronic device. Examples of surface-based electronic devices include desktop computers, laptop computers, tablet computers, smartphones, PDAs, server computers, and similar electronic devices. In some embodiments, downhole electromagnetic tool calibration system 102 is a downhole electronic device, or is a component of a downhole tool, such as downhole electromagnetic tool 104. In some embodiments, downhole electromagnetic tool calibration system 102 contains or is communicatively connected to a storage medium that contains data indicative of calibration measurements, models of downhole electromagnetic tools, and instructions to perform the operations described herein. Additional descriptions of downhole electromagnetic tool calibration system 102 are provided in the paragraphs below.

Downhole electromagnetic tool 104 has one transmitter 112, a first collocated receiver 122 and a second collocated receiver 124. The T-R spacing between transmitter 112 and first collocated receiver 122 is represented by line 132. Further, the T-R spacing between transmitter 112 and second collocated receiver 124 is represented by line 134. Downhole electromagnetic tool 104 also has a storage medium 106 that stores data indicative of physical properties (e.g., orientations, specifications, tilts, etc.) of transmitter 112, collocated receivers 122 and 124, and other components of downhole electromagnetic tool 104. In some embodiments, storage medium 106 also stores measurements obtained from transmitter 112 and collocated receivers 122 and 124, and instructions from downhole electromagnetic tool calibration system 102. In some embodiments, downhole electromagnetic tool calibration system 102 is an onboard component of downhole electromagnetic tool 104.

Although FIG. 1 illustrates downhole electromagnetic tool 104 having one transmitter 112 and two collocated receivers 122 and 124, in some embodiments, downhole electromagnetic tool 104 is equipped with a different number of transmitters and a different number of receivers. In one or more of such embodiments, where downhole electromagnetic tool 104 includes a second collocated transmitter (not shown), the T-R spacing between the second collocated transmitter and first collocated receiver 122, and the T-R spacing between the second collocated transmitter and second collocated receiver 124 are obtained. In some embodiments, transmitter 112 and collocated receivers 122 and 124 are transceivers that are operable to simultaneously or alternatively transmit and receive signals. Additional descriptions of different embodiments of downhole electromagnetic tool calibration system 102, downhole electromagnetic tool 104, and methods to configure a downhole electromagnetic tool are provided in the paragraphs below.

Figure 2:
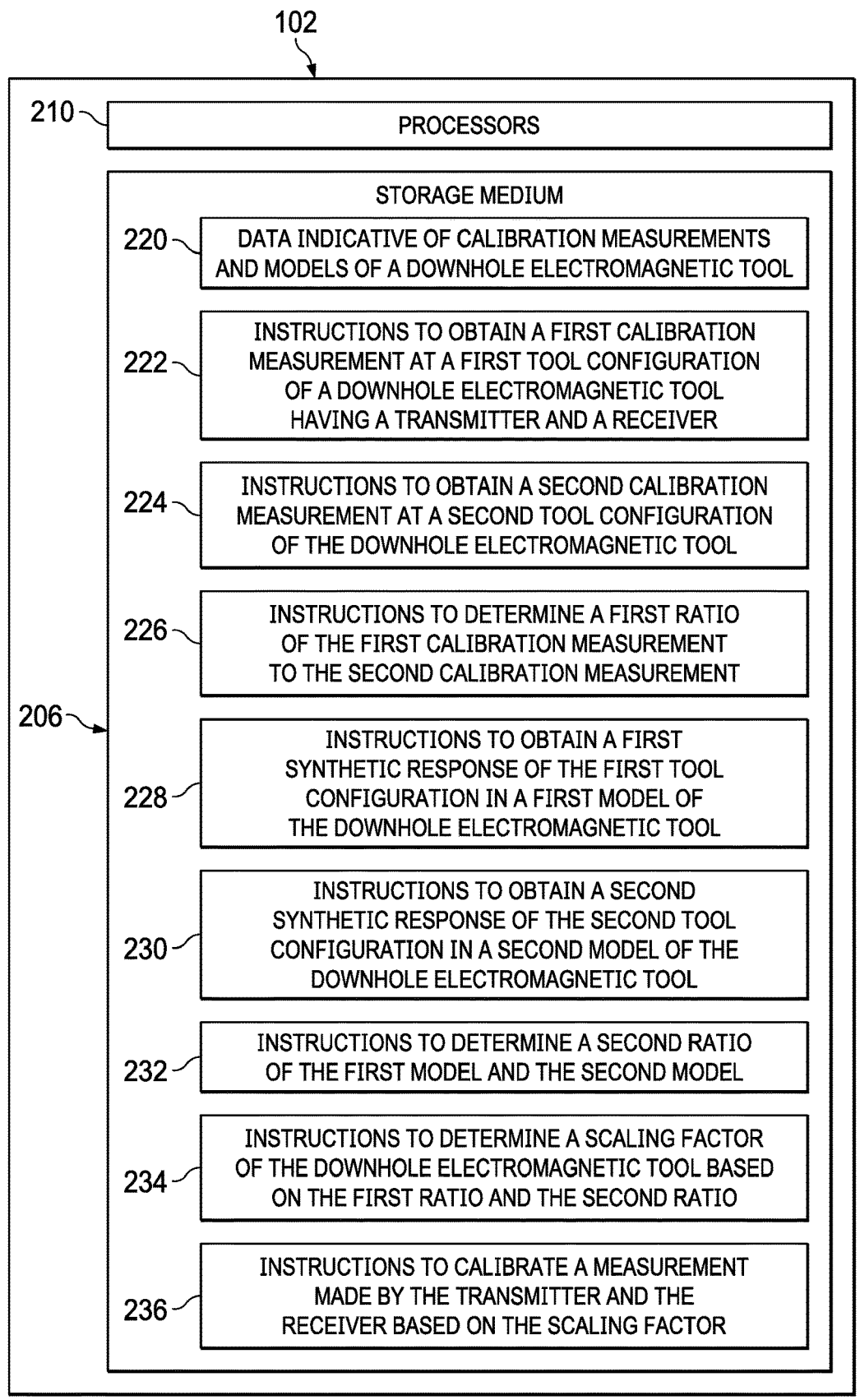
FIG. 2 illustrates a system diagram of the downhole electromagnetic tool calibration system of FIG. 1.

FIG. 2 illustrates a system diagram of downhole electromagnetic tool calibration system 102 of FIG. 1. Downhole electromagnetic tool calibration system 102 includes a storage medium 206 and processors 210. Storage medium 206 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 206 includes multiple data storage devices. In further embodiments, the multiple data storage devices may be physically stored at different locations. Data indicative of calibration measurements and models of downhole electromagnetic tools are stored at a first location 220 of storage medium 206.

As shown in FIG. 2, instructions to obtain a first calibration measurement of a first tool configuration of a downhole electromagnetic tool having a transmitter and a receiver are stored at a second location 222 of storage medium 206. Further, instructions to obtain a second calibration measurement of a second tool configuration of the downhole electromagnetic tool are stored at a third location 224 of the storage medium 206. Further, instructions to determine a first ratio of the first calibration measurement to the second calibration measurement are stored at a fourth location 226 of storage medium 206. Further, instructions to obtain a first synthetic response of the first tool configuration in a first model of the downhole electromagnetic tool are stored at a fifth location 228 of storage medium 206. Further, instructions to obtain a second synthetic response of the second tool configuration in a second model of the downhole electromagnetic tool are stored at a sixth location 230 of storage medium 206. Further, instructions to determine a second ratio of the first model and the second model are stored at a seventh location 232 of storage medium 206. Further, instructions to determine a scaling factor of the downhole electromagnetic tool based on the first ratio and the second ratio are stored at an eighth location 234 of storage medium 206. Further, instructions to calibrate a measurement made by the transmitter and the receiver based on the scaling factor are stored at a ninth location 236 of storage medium 206. The instructions to perform other operations described herein are also stored in storage medium 206. In some embodiments, downhole electromagnetic tool calibration system 102 is a component of downhole electromagnetic tool 104 of FIG. 1. In one or more of such embodiments, storage medium 206 is storage medium 106 of FIG. 1 or is a component of storage medium 106 of FIG. 1.

Figure 3:
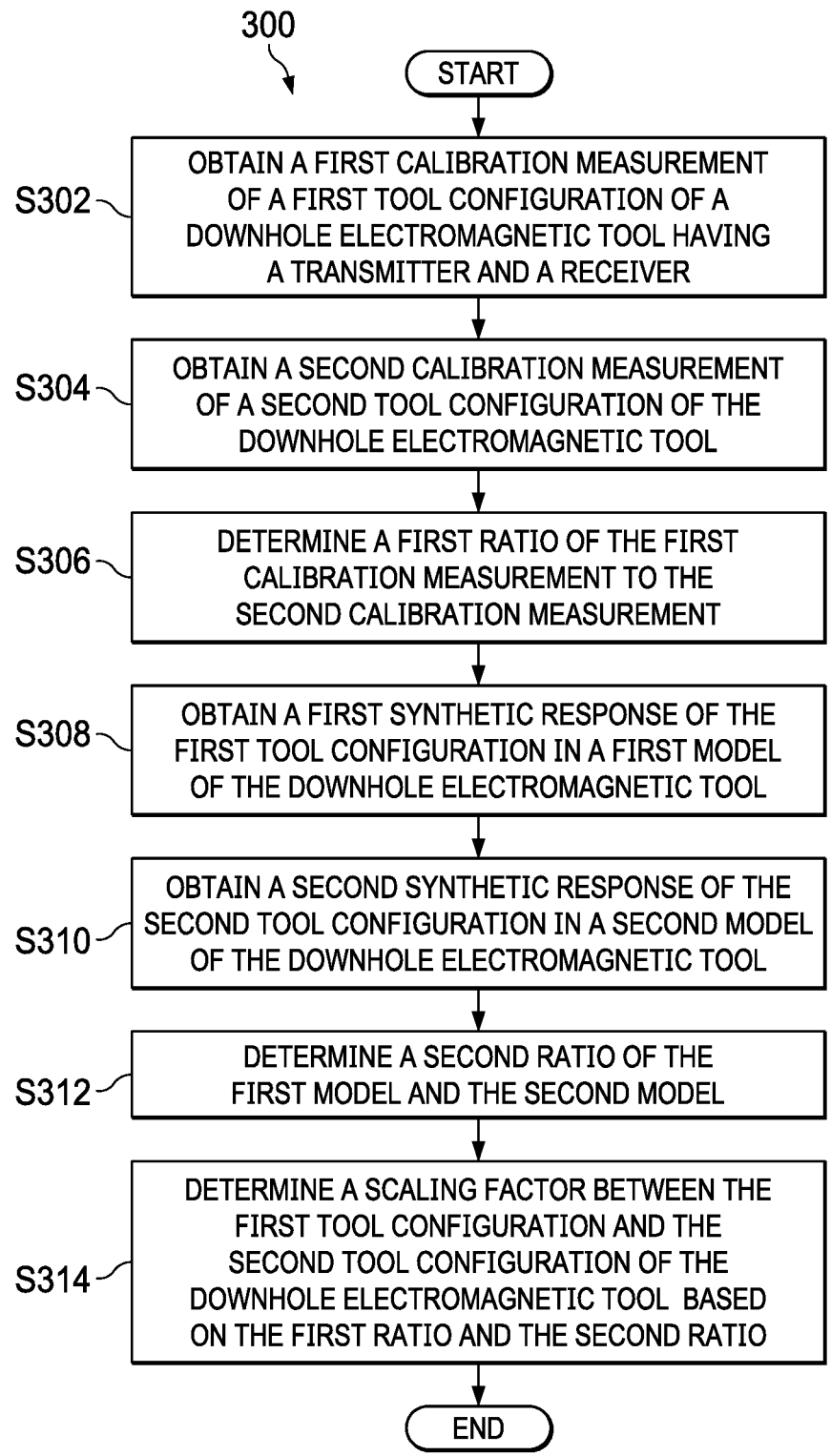
FIG. 3 illustrates a flowchart of a process to configure the downhole electromagnetic tool of FIG. 1.

FIG. 3 illustrates a flowchart 300 of a process to configure downhole electromagnetic tool 104 of FIG. 1. Although the operations in process 300 are shown in a particular sequence, certain operations may be performed in different sequences or at the same time where feasible. Further, although the operations are described to be performed by processors 210 of downhole electromagnetic tool calibration system 102 of FIGS. 1 and 2, the operations may be performed by other processors of other downhole electromagnetic tool calibration systems.

At block S302, a first calibration measurement of a first tool configuration of a downhole electromagnetic tool having a transmitter and a receiver is obtained. FIG. 1, for example, illustrates processors of downhole electromagnetic tool calibration system 102 obtaining measurement of T-R spacing 132. At block S304, a second calibration measurement of a second tool configuration of the downhole electromagnetic tool is obtained. FIG. 1, for example, illustrates processors of downhole electromagnetic tool calibration system 102 obtaining a second measurement of T-R spacing 132. In some embodiments, the processors of downhole electromagnetic tool calibration system 102 obtain the first calibration measurement while downhole electromagnetic tool calibration system 102 is operating in a first environment (e.g., a gas tank), and obtain the second calibration measurement while downhole electromagnetic tool calibration system 102 is operating in a second environment (e.g., a liquid tank) that has different electrical properties than the first environment. In some embodiments, the processors of downhole electromagnetic tool calibration system 102 obtain the first calibration measurement while downhole electromagnetic tool calibration system 102 is operating in a first frequency or frequency range, and obtain the second calibration measurement while downhole electromagnetic tool calibration system 102 is operating in a second frequency range. In some embodiments, the first calibration measurement is a measurement of T-R spacing 132 whereas the second calibration measurement is a measurement of T-R spacing 134.

At block S306, a first ratio of the first calibration measurement to the second calibration measurement is obtained. In some embodiments, the processors of downhole electromagnetic tool calibration system 102 of FIG. 1 obtain a difference between the value of the first calibration measurement and the second calibration measurement, where the first ratio of the first calibration measurement to the second calibration measurement is the difference between the first calibration measurement and the second calibration measurements. Additional descriptions and examples of determining the ratio of the first calibration measurement to the second calibration measurement are provided in the paragraphs below.

At block S308, a first synthetic response of the first tool configuration from a first model of the downhole electromagnetic tool is obtained. In some embodiments, the processors of downhole electromagnetic tool calibration system 102 determine a dipole model of the first tool configuration (e.g., T-R spacing 132 of transmitter 112 and first collocated receiver 122 or T-R spacing 134 of transmitter 112 and second collocated receiver 124 of FIG. 1). In some embodiments, the processors of downhole electromagnetic tool calibration system 102 determine a coil model of the first tool configuration (e.g., T-R spacing 132 of transmitter 112 and first collocated receiver 122 or T-R spacing 134 of transmitter 112 and second collocated receiver 124). In some embodiments, the processors of downhole electromagnetic tool calibration system 102 determine a three-dimensional antenna geometry model of the first tool configuration (e.g., T-R spacing 132 of transmitter 112 and first collocated receiver 122 or T-R spacing 134 of transmitter 112 and second collocated receiver 124). At block S310, a second synthetic response of the second tool configuration from a second model of the downhole electromagnetic tool is obtained. In some embodiments, where the first model is a model of a downhole electromagnetic tool in a first environment (e.g., in a gas tank), the second model is a model of the downhole electromagnetic tool in a second environment. In some embodiments, where the first model of the downhole electromagnetic tool is a model of the downhole electromagnetic tool operating at a first frequency or within a first frequency range, the second model of the downhole electromagnetic tool is a model of the downhole electromagnetic tool operating at a second frequency or within a second frequency range. In some embodiments, where the first model is a model of one transmitter-receiver set (e.g., transmitter 112 and first collocated receiver 122 of FIG. 1), the second model is a model of another transmitter-receiver set (e.g., transmitter 112 and second collocated receiver 124).

At block S312, a second ratio of the first synthetic response to the second synthetic response is determined. In some embodiments, the processors of downhole electromagnetic tool calibration system 102 of FIG. 1 obtain a difference between the value of the first synthetic response and the second synthetic response, where the second ratio of the first synthetic response to the second synthetic response is the difference between the first synthetic response and the second synthetic response. Additional descriptions and examples of determining the ratio of the first synthetic response to the second synthetic response are provided in the paragraphs below. At block S314, a scaling factor between the first tool configuration and the second tool configuration of the downhole electromagnetic tool is determined based on the first ratio and the second ratio. In some embodiments, the processors of downhole electromagnetic tool calibration system 102 of FIG. 1 obtain a difference between the value of the first ratio and the second ratio, where the scaling factor is the difference between the first ratio and the second ratio. Additional descriptions and examples of determining the scaling factor between the two tool configurations are provided in the paragraphs below. In some embodiments, the processors of downhole electromagnetic tool calibration system 102, after determining a scaling factor for a transmitter-receiver set of a downhole electromagnetic tool, calibrate measurements made by the transmitter-receiver set of the downhole electromagnetic tool based on the determined scaling factor.

Figure 4:
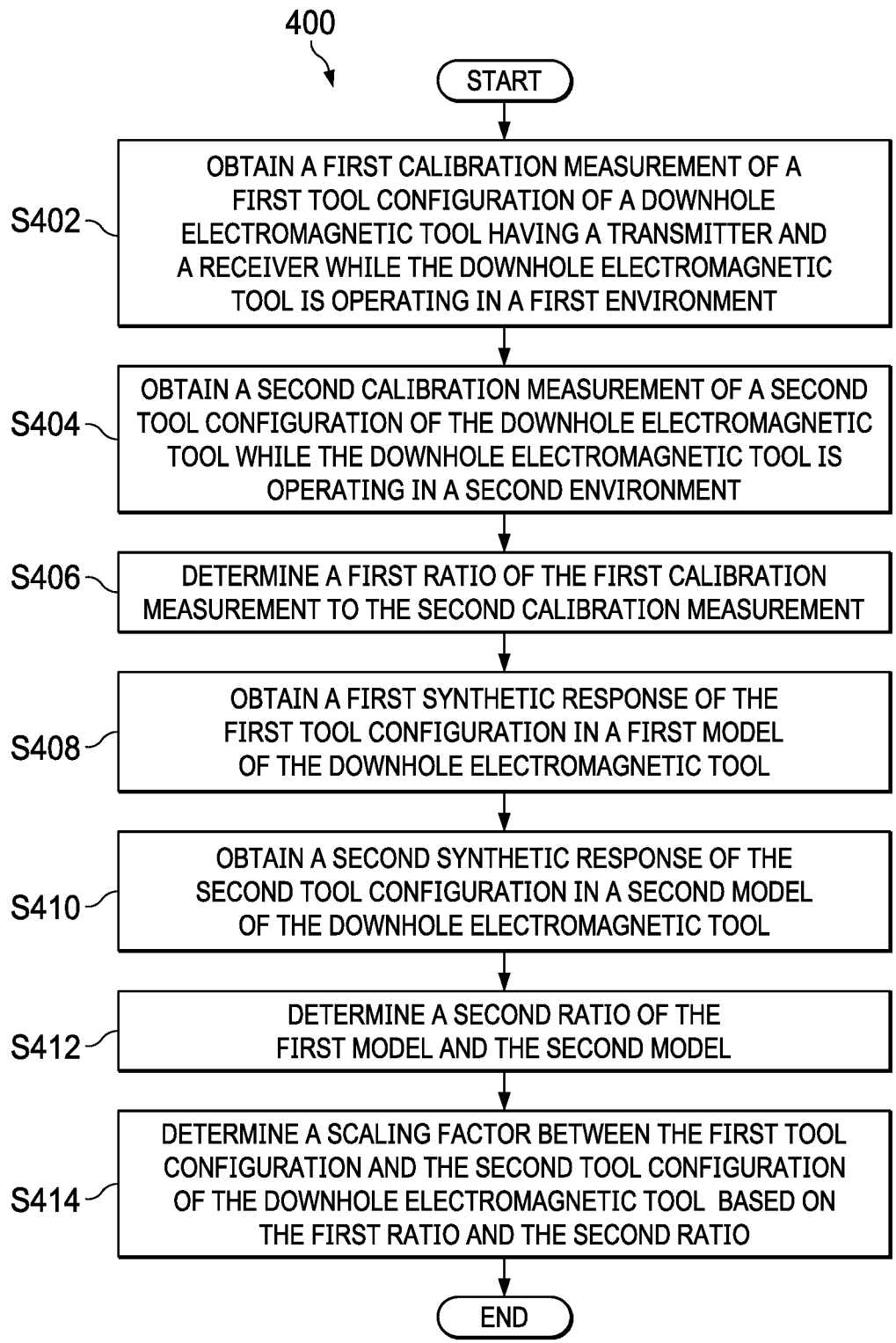
FIG. 4 illustrates a flowchart of another process to configure the downhole electromagnetic tool of FIG. 1 by operating the downhole electromagnetic tool in two different environments.

FIG. 4 illustrates a flowchart of another process 400 to configure downhole electromagnetic tool 104 of FIG. 1 by operating downhole electromagnetic tool 104 in two different environments. Although the operations in process 400 are shown in a particular sequence, certain operations may be performed in different sequences or at the same time where feasible. Further, although the operations are described to be performed by processors 210 of downhole electromagnetic tool calibration system 102 of FIGS. 1 and 2, the operations may be performed by other processors of other downhole electromagnetic tool calibration systems.

At block S402, a first calibration measurement of a first tool configuration of a downhole electromagnetic tool having a transmitter and a receiver is obtained while the downhole electromagnetic tool is operating in a first environment. In some embodiments, the first environment is a gaseous environment. Examples of gaseous environments include, but are not limited to, an oxygen chamber, a nitrogen chamber, a helium chamber, or a chamber filled with another gas or a gas mixture. In some embodiments, the first environment is a liquid environment. Examples of liquid environments include, but are not limited to, a water chamber, an oil chamber, or a chamber containing another liquid or liquid mixture. At block S404, a second calibration measurement of a second tool configuration of the downhole electromagnetic tool is obtained while the downhole electromagnetic tool is operating in a second environment. In some embodiments, the first tool configuration and the second tool configuration have an identical configuration, however, electrical properties of the first environment are different from the electrical properties of the second environment. For example, where the first environment is a liquid chamber, the second environment is a gaseous chamber. Alternatively, where the first environment is a liquid chamber containing a first type of liquid (e.g., water), the second environment is a liquid chamber containing a second type of liquid (e.g., oil) that has different electrical properties than the first type of liquid. Table T-1 provides exemplary measurements of transmitter 112 and first collocated receiver 122 of downhole electromagnetic tool 104 of FIG. 1, and is provided below.

TABLE T-1

| Environment | Attenuation (decibel) | Phase (degree) |
|---|---|---|
| Air (2000 Ohm meter) | A1 | P1 |
| Water (0.2 Ohm meter) | A2 | P2 |

A1 of table T-1 represents a real component (attenuation) of the first calibration measurement of T-R spacing 132 of transmitter 112 and first collocated receiver 122 while downhole electromagnetic tool 104 is operating in an air chamber, and P1 represents an imaginary component (phase) of the first calibration measurement of T-R spacing 132 of transmitter 112 and first collocated receiver 122 while downhole electromagnetic tool 104 is operating in the air chamber. Further, A2 of Table T-1 represents a real component of the second calibration measurement of T-R spacing 132 of transmitter 112 and first collocated receiver 122 while downhole electromagnetic tool 104 is operating in a water chamber, and P2 represents an imaginary component of the second calibration measurement of T-R spacing 132 of transmitter 112 and first collocated receiver 122 while downhole electromagnetic tool 104 is operating in the water chamber.

At block S406, a first ratio of the first calibration measurement to the second calibration measurement is determined. Table T-2 provides an exemplary method for determining the ratio of the first calibration measurement to the second calibration measurement, and is provided below.

TABLE T-2

| Environment | Attenuation (decibel) | Phase (degree) |
|---|---|---|
| Air/Water | A1-A2 | P1-P2 |

In the embodiment illustrated by Table T-2, the real component of the ratio of the first calibration measurement and the second calibration measurement is the difference between A1 and A2, whereas the imaginary component of the ratio of the first calibration measurement and the second calibration measurement is the difference between P1 and P2.

At block S408, a first synthetic response of the first tool configuration from a first model of the downhole electromagnetic tool is obtained while the downhole electromagnetic tool is operating in the first environment. Continuing with the foregoing example, the processors of downhole electromagnetic tool calibration system 102 of FIG. 1 determine a model of the first tool configuration of T-R spacing 132 of transmitter 112 and first collocated receiver 122 while downhole electromagnetic tool 104 is operating in an air chamber. Examples of models of the downhole electromagnetic tool are provided herein. At block S410, a second synthetic response of the second tool configuration from a second model of the downhole electromagnetic tool is obtained while the downhole electromagnetic tool is operating in the second environment. Continuing with the foregoing example, the processors of downhole electromagnetic tool calibration system 102 of FIG. 1 determine a model of the second tool configuration of T-R spacing 132 of transmitter 112 and first collocated receiver 122 while downhole electromagnetic tool 104 is operating in a water chamber. Table T-3 provides exemplary synthetic responses of the first and second tool configurations of transmitter 112 and first collocated receiver 122 of downhole electromagnetic tool 104 of FIG. 1, and is provided below.

TABLE T-3

| Environment | Attenuation (decibel) | Phase (degree) |
| --- | --- | --- |
| Air (2000 ohmmeter) | A3 | P3 |
| Water (0.2 Ohm meter) | A4 | P4 |

A3 of Table T-3 represents a real component of the first synthetic response of T-R spacing 132 of transmitter 112 and first collocated receiver 122 while downhole electromagnetic tool 104 is operating in the air chamber, and P3 represents an imaginary component (phase) of the first synthetic response of T-R spacing 132 of transmitter 112 and first collocated receiver 122 while downhole electromagnetic tool 104 is operating in the air chamber. Further, A4 of Table T-3 represents a real component of T-R spacing 132 of the second synthetic response of transmitter 112 and first collocated receiver 122 while downhole electromagnetic tool 104 is operating in the water chamber, and P4 represents an imaginary component of the second synthetic response of T-R spacing 132 of transmitter 112 and first collocated receiver 122 while downhole electromagnetic tool 104 is operating in the water chamber.

At block S412, a second ratio of the first synthetic response to the second synthetic response is determined. Table T-4 provides exemplary an method for determining the ratio of the first synthetic response to the second synthetic response, and is provided below.

TABLE T-4

| Environment | Attenuation (decibel) | Phase (degree) |
| --- | --- | --- |
| Air/Water | A3-A4 | P3-P4 |

In the embodiment illustrated by Table T-4, the real component of the ratio of the first synthetic response and the second synthetic response is the difference between A3 and A4, whereas the imaginary component of the ratio of the first synthetic response and the second synthetic response is the difference between P3 and P4.

At block S414, a scaling factor between the first tool configuration and the second tool configuration of the downhole electromagnetic tool is determined based on the first ratio and the second ratio. Table T-5 provides exemplary an method for determining the scaling factor between the first tool configuration and the second tool configuration, and is provided below.

TABLE T-5

| Tool Configuration | Attenuation (decibel) | Phase (degree) |
| --- | --- | --- |
| Transmitter 112 - first receiver 122 of FIG. 1 | (A1-A2)-(A3-A4) | (P1-P2)-(P3-P4) |

In the embodiment illustrated by Table T-5, the real component of the scaling factor is the difference between the real component of the first ratio (A1-A2) and the real component of the second ratio (A3-A4), whereas the imaginary component of the scaling factor is the difference between the imaginary component of the first ratio (P1-P2) and the imaginary component of the second ratio (P3-P4).

Figure 5:
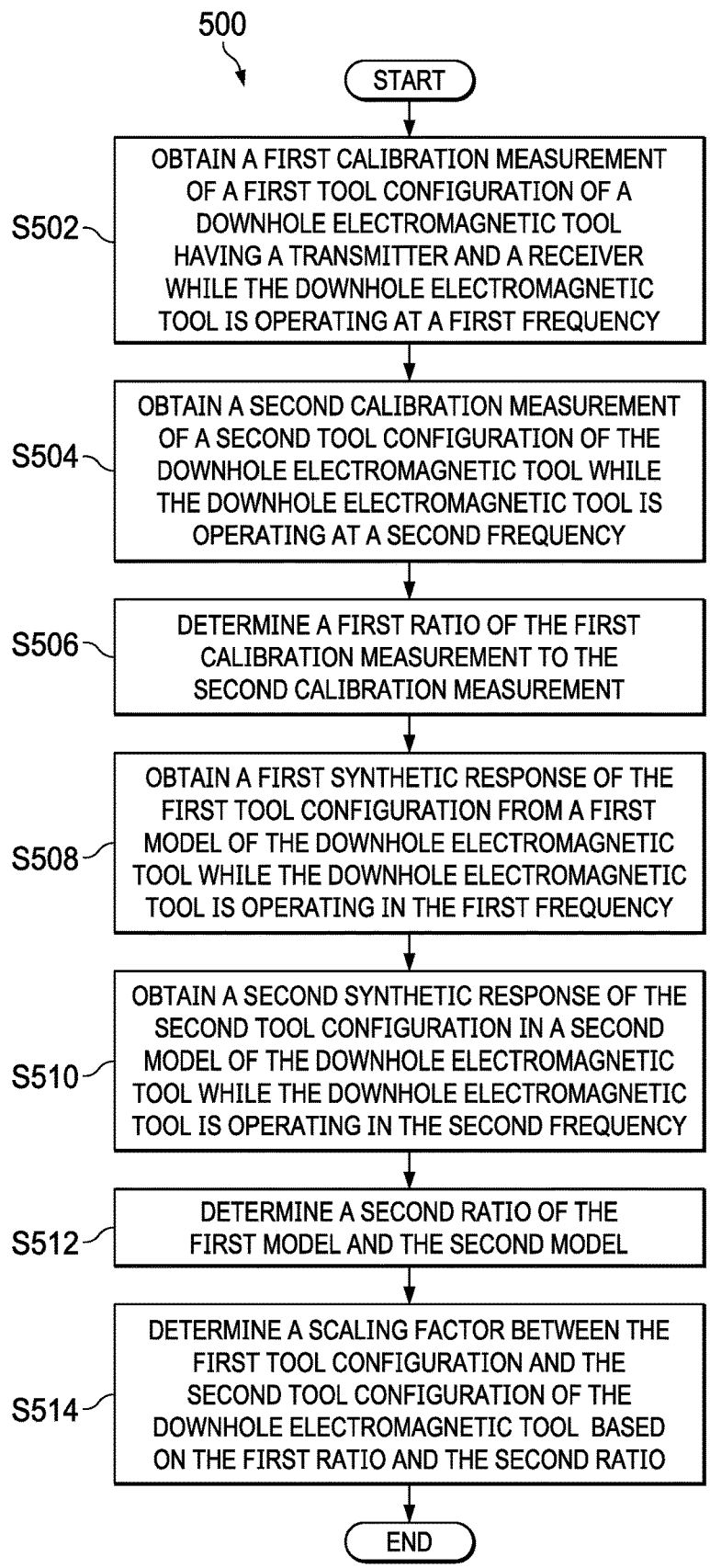
FIG. 5 illustrates a flowchart of another process to configure the downhole electromagnetic tool of FIG. 1 by operating the downhole electromagnetic tool at two different frequencies.

FIG. 5 illustrates a flowchart of another process to configure downhole electromagnetic tool 104 of FIG. 1 by operating downhole electromagnetic tool 104 at two different frequencies. Although the operations in process 500 are shown in a particular sequence, certain operations may be performed in different sequences or at the same time where feasible. Further, although the operations are described to be performed by processors 210 of downhole electromagnetic tool calibration system 102 of FIGS. 1 and 2, the operations may be performed by other processors of other downhole electromagnetic tool calibration systems.

At block S502, a first calibration measurement of a first tool configuration of a downhole electromagnetic tool having a transmitter and a receiver is obtained while the downhole electromagnetic tool is operating in a first frequency. At block S504, a second calibration measurement of a second tool configuration of the downhole electromagnetic tool is obtained while the downhole electromagnetic tool is operating in a second frequency. In some embodiments, the processors of downhole electromagnetic tool calibration system 102 of FIG. 1 perform the operations of block S502 while downhole electromagnetic tool 104 of FIG. 1 is operating in a first frequency range (e.g., 10-15 kHz), and perform the operations of block S504 while downhole electromagnetic tool 104 is operating in a second frequency range (e.g., 20-25 kHz) that is outside of the first frequency range. In some embodiments, the processors of downhole electromagnetic tool calibration system 102 perform the operations of blocks S502 and S504 while downhole electromagnetic tool 104 is deployed in the same environment (e.g., deployed in a gaseous environment (an air chamber) during both operations, or deployed in a liquid environment (a water chamber) during both operations), where the electrical properties of the environment do not change during both operations. Table T-6 provides exemplary measurements of transmitter 112 and first collocated receiver 122 of downhole electromagnetic tool 104 while downhole electromagnetic tool 104 operates in two different frequencies, and is provided below.

TABLE T-6

| Operating Frequency | Attenuation (decibel) | Phase (degree) |
|---|---|---|
| F1 | A11 | P11 |
| F2 | A12 | P12 |

All of Table T-6 represents a real component of the first calibration measurement of T-R spacing 132 of transmitter 112 and first collocated receiver 122 while downhole electromagnetic tool 104 is operating at frequency F1, and P11 represents an imaginary component of the first calibration measurement of T-R spacing 132 of transmitter 112 and first collocated receiver 122 while downhole electromagnetic tool 104 is operating at frequency F1. Further, A12 of Table T-6 represents a real component of the second calibration measurement of T-R spacing 132 of transmitter 112 and first collocated receiver 122 while downhole electromagnetic tool 104 is operating at frequency F2 that is different from F1, and P12 represents an imaginary component of the second calibration measurement of T-R spacing 132 of transmitter 112 and first collocated receiver 122 while downhole electromagnetic tool 104 is operating at frequency F2.

At block S506, a first ratio of the first calibration measurement to the second calibration measurement is determined. Table T-7 provides an exemplary method for determining the ratio of the first calibration measurement to the second calibration measurement, and is provided below.

TABLE T-7

| Operating Frequency | Attenuation (decibel) | Phase (degree) |
|---|---|---|
| F1/F2 | A11-A12 | P11-P12 |

In the embodiment illustrated by Table T-7, the real component of the ratio of the first calibration measurement and the second calibration measurement is the difference between A11 and A12, whereas the imaginary component of the ratio of the first calibration measurement and the second calibration measurement is the difference between P11 and P12.

At block S508, a first synthetic response of the first tool configuration from a first model of the downhole electromagnetic tool is obtained while the first downhole electromagnetic tool is operating at the first frequency. Continuing with the foregoing example, the processors of downhole electromagnetic tool calibration system 102 of FIG. 1 determine a model of the first tool configuration of T-R spacing 132 of transmitter 112 and first collocated receiver 122 while downhole electromagnetic tool 104 is operating at frequency F1. Examples of models of the downhole electromagnetic tool are provided herein. At block S510, a second synthetic response of the second tool configuration from a second model of the downhole electromagnetic tool is obtained while the downhole electromagnetic tool is operating at a second frequency. Continuing with the foregoing example, the processors of downhole electromagnetic tool calibration system 102 of FIG. 1 determine a model of the second tool configuration of T-R spacing 132 of transmitter 112 and first collocated receiver 122 while downhole electromagnetic tool 104 is operating at frequency F2. Table T-8 provides exemplary synthetic responses of the first and second configurations of transmitter 112 and first collocated receiver 122 of downhole electromagnetic tool 104 of FIG. 1, and is provided below.

TABLE T-8

| Operating Frequency | Attenuation (decibel) | Phase (degree) |
|---|---|---|
| F1 | A13 | P13 |
| F2 | A14 | P14 |

A13 of Table T-8 represents a real component of the first synthetic response of T-R spacing 132 of transmitter 112 and first collocated receiver 122 while downhole electromagnetic tool 104 is operating at frequency F 1, and P13 represents an imaginary component (phase) of the first synthetic response of T-R spacing 132 of transmitter 112 and first collocated receiver 122 while downhole electromagnetic tool 104 is operating at frequency F1. Further, A14 of Table T-8 represents a real component of T-R spacing 132 of the second synthetic response of transmitter 112 and first collocated receiver 122 while downhole electromagnetic tool 104 is operating at frequency F2, and P14 represents an imaginary component of the second synthetic response of T-R spacing 132 of transmitter 112 and first collocated receiver 122 while downhole electromagnetic tool 104 is operating at frequency F2.

At block S512, a second ratio of the first synthetic response to the second synthetic response is determined. Table T-9 provides an exemplary method for determining the ratio of the first synthetic response to the second synthetic response, and is provided below.

TABLE T-9

| Operating Frequency | Attenuation (decibel) | Phase (degree) |
|---|---|---|
| F1/F2 | A13-A14 | P13-P14 |

In the embodiment illustrated by Table T-9, the real component of the ratio of the first synthetic response and the second synthetic response is the difference between A13 and A14, whereas the imaginary component of the ratio of the first synthetic response and the second synthetic response is the difference between P13 and P14.

At block S514, a scaling factor between the first tool configuration and the second tool configuration of the downhole electromagnetic tool is determined based on the first ratio and the second ratio. Table T-10 provides an exemplary method for determining the scaling factor between the first tool configuration and the second tool configuration, and is provided below.

TABLE T-10

| Operating Frequency | Attenuation (decibel) | Phase (degree) |
|---|---|---|
| F1/F2 | (A11-A12)-(A13-A14) | (P11-P12)-(P13-P14) |

In the embodiment illustrated by Table T-10, the real component of the scaling factor is the difference between the real component of the first ratio (A11-A12) and the real component of the second ratio (A13-A14), whereas the imaginary component of the scaling factor is the difference between the imaginary component of the first ratio (P11-P12) and the imaginary component of the second ratio (P13 and P14).

Figure 6:
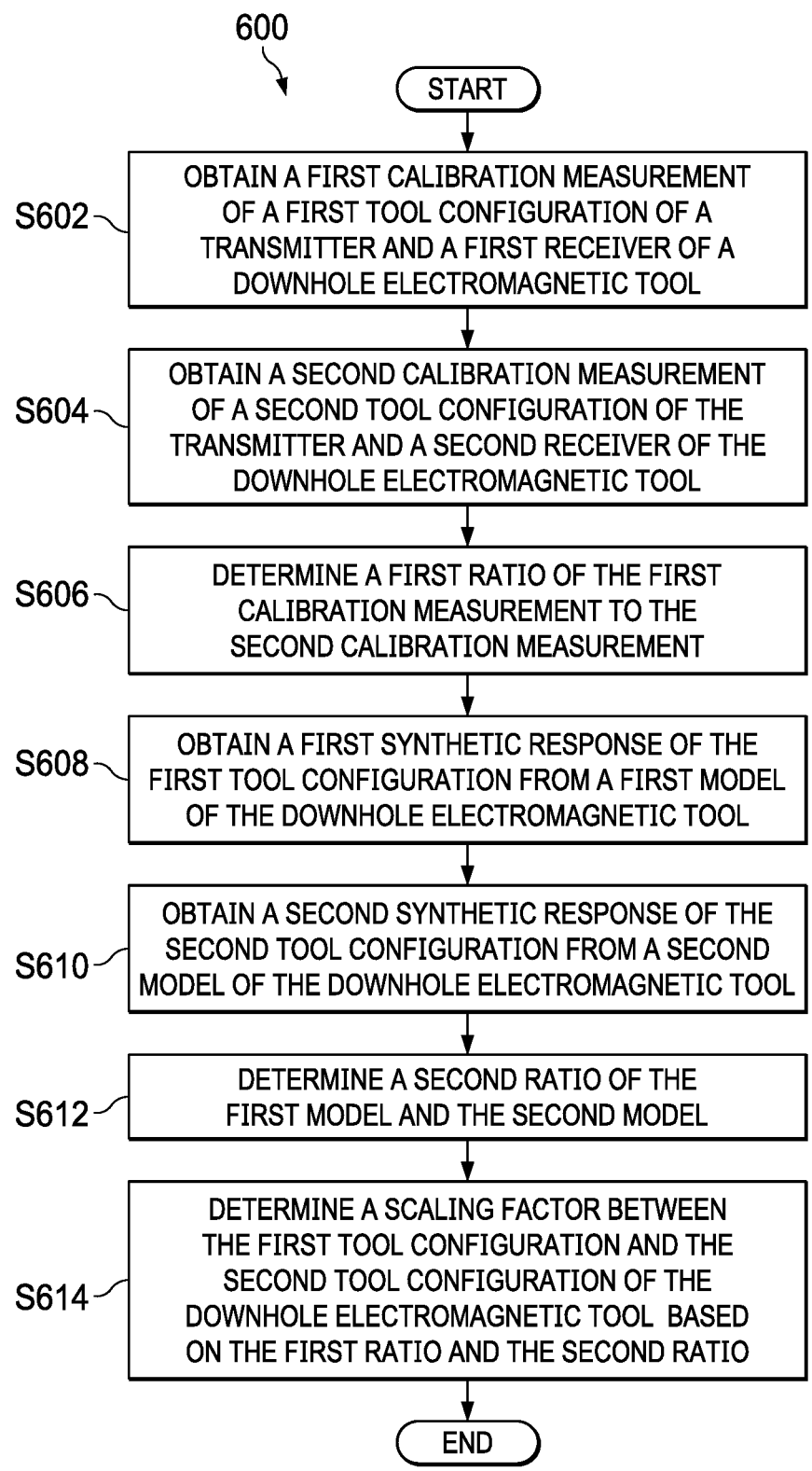
FIG. 6 illustrates another process to configure the downhole electromagnetic tool of FIG. 1 by operating one transmitter and two receivers of the downhole electromagnetic tool.

FIG. 6 illustrates another process to configure downhole electromagnetic tool 104 of FIG. 1 by operating transmitter 112 and two receivers 122 and 124 of downhole electromagnetic tool 104. Although the operations in process 600 are shown in a particular sequence, certain operations may be performed in different sequences or at the same time where feasible. Further, although the operations are described to be performed by processors 210 of downhole electromagnetic tool calibration system 102 of FIGS. 1 and 2, the operations may be performed by other processors of other downhole electromagnetic tool calibration systems.

At block S602, a first calibration measurement of a first tool configuration of a transmitter and a first receiver of a downhole electromagnetic tool is obtained. At block S604, a second calibration measurement of a second tool configuration of the transmitter and a second receiver of the downhole electromagnetic tool is obtained. In some embodiments, the processors of downhole electromagnetic tool calibration system 102 of FIG. 1 perform the operations of block S602 to determine the tool configuration of T-R spacing 132 of transmitter 112 and first collocated receiver 122, and perform the operations of block S504 to determine the tool configuration of T-R spacing 134 of transmitter 112 and second collocated receiver 124. In some embodiments, the processors of downhole electromagnetic tool calibration system 102 perform the operations of blocks S602 and S604 while downhole electromagnetic tool 104 is deployed in the same environment (e.g., deployed in an air chamber during both operations, or deployed in a water chamber during both operations), where the electrical properties of the environment do not change during both operations. In some embodiments, the processors of downhole electromagnetic tool calibration system 102 perform operations of blocks S602 and S604 while downhole electromagnetic tool 104 is operating at a single frequency or frequency range. Table T-11 provides exemplary calibration measurements of T-R spacing 132 of transmitter 112 and first collocated receiver 122 and T-R spacing 134 of transmitter 112 and second collocated receiver 124, and is provided below.

TABLE T-11

| Tool Configuration | Attenuation (decibel) | Phase (degree) |
|---|---|---|
| T-R spacing 132 of transmitter 112 and first collocated receiver 122 | A21 | P21 |
| T-R spacing 134 of transmitter 112 and second collocated receiver 124 | A22 | P22 |

A21 of Table T-11 represents a real component of the first calibration measurement of T-R spacing 132 of transmitter 112 and first collocated receiver 122, and P21 represents an imaginary component of the first calibration measurement of T-R spacing 132 of transmitter 112 and first collocated receiver 122. Further, A22 of Table T-11 represents a real component of the second calibration measurement of T-R spacing 134 of transmitter 112 and second collocated receiver 124 of downhole electromagnetic tool, and P22 represents an imaginary component of the second calibration measurement of T-R spacing 134 of transmitter 112 and second collocated receiver 124.

At block S606, a first ratio of the first calibration measurement to the second calibration measurement is determined. Table T-12 provides an exemplary method for determining the ratio of the first calibration measurement to the second calibration measurement, and is provided below.

TABLE T-12

| Tool Configuration | Attenuation (decibel) | Phase (degree) |
|---|---|---|
| T-R spacing 132/T-R spacing 134 | A21-A22 | P21-P22 |

In the embodiment illustrated by Table T-12, the real component of the ratio of the first calibration measurement and the second calibration measurement is the difference between A21 and A22, whereas the imaginary component of the ratio of the first calibration measurement and the second calibration measurement is the difference between P21 and P22.

At block S608, a first synthetic response of the first tool configuration from a first model of the downhole electromagnetic tool is obtained. Continuing with the foregoing example, the processors of downhole electromagnetic tool calibration system 102 of FIG. 1 determine a model of the first tool configuration of T-R spacing 132 of transmitter 112 and first collocated receiver 122. Examples of models of the downhole electromagnetic tool are provided herein. At block S610, a second synthetic response of the second tool configuration from a second model of the downhole electromagnetic tool is obtained. Continuing with the foregoing example, the processors of downhole electromagnetic tool calibration system 102 of FIG. 1 determine a model of the first tool configuration of T-R spacing 134 of transmitter 112 and second collocated receiver 124. Examples of models of the downhole electromagnetic tool are provided herein. Table T-13 provides exemplary synthetic responses of the first and second tool configurations of transmitter 112 and first collocated receiver 122 and transmitter 112 and second collocated receiver 124 of downhole electromagnetic tool 104 of FIG. 1, and is provided below.

TABLE T-13

| Tool Configuration | Attenuation (decibel) | Phase (degree) |
|---|---|---|
| T-R spacing 132 of transmitter 112 and first collocated receiver 122 | A23 | P23 |
| T-R spacing 134 of transmitter 112 and second collocated receiver 124 | A24 | P24 |

A23 of Table T-13 represents a real component of the first synthetic response of T-R spacing 132 of transmitter 112 and first collocated receiver 122, and P23 represents an imaginary component (phase) of the first synthetic response of T-R spacing 132 of transmitter 112 and first collocated receiver 122. Further, A24 of Table T-13 represents a real component of the T-R spacing 134 of the second synthetic response of transmitter 112 and second collocated receiver 124, and P24 represents an imaginary component of the second synthetic response of the T-R spacing 134 of transmitter 112 and second collocated receiver 124.

At block S612, a second ratio of the first synthetic response to the second synthetic response is determined. Table T-14 provides an exemplary method for determining the ratio of the first synthetic response to the second synthetic response, and is provided below.

TABLE T-14

| Tool Configuration | Attenuation (decibel) | Phase (degree) |
| --- | --- | --- |
| T-R spacing 132/T-R spacing 134 | A23-A24 | P23-P24 |

In the embodiment illustrated by Table T-14, the real component of the ratio of the first synthetic response and the second synthetic response is the difference between A23 and A24, whereas the imaginary component of the ratio of the first synthetic response and the second synthetic response is the difference between P23 and P24.

At block S614, a scaling factor between the first tool configuration and the second tool configuration of the downhole electromagnetic tool is determined based on the first ratio and the second ratio. Table T-15 provides an exemplary method for determining the scaling factor between the first tool configuration and the second tool configuration, and is provided below.

TABLE T-15

| Tool Configuration | Attenuation (decibel) | Phase (degree) |
| --- | --- | --- |
| T-R spacing 132/T-R spacing 134 | (A21-A22)-(A23-A24) | (P21-P22)-(P23-P24) |

In the embodiment illustrated by Table T-15, the real component of the scaling factor is the difference between the real component of the first ratio (A21-A22) and the real component of the second ratio (A23-A24), whereas the imaginary component of the scaling factor is the difference between the imaginary component of the first ratio (P21-P22) and the imaginary component of the second ratio (P23-P24).

FIG. 7A is a schematic, side view of a logging environment 700 with a downhole electromagnetic tool 720 similar or identical to downhole electromagnetic tool 104 of FIG. 1 and deployed in a borehole 706 to measure properties of a formation 712 surrounding borehole 706. FIG. 7A may also represent another completion or preparation environment where a logging operation is performed. In the embodiment of FIG. 7A, a well 702 having borehole 706 extends from a surface 708 of well 702 to or through formation 712. A conveyance 716, optionally carried by a vehicle 780, is positioned proximate to well 702. Conveyance 716 along with downhole electromagnetic tool 720 are lowered down borehole 706, i.e. downhole. In one or more embodiments, conveyance 716 and downhole electromagnetic tool 720 are lowered downhole through a blowout preventer 703. In one or more embodiments, conveyance 716 may be wireline, slickline, coiled tubing, drill pipe, production tubing, downhole tractor or another type of conveyance operable to deploy downhole electromagnetic tool 720.

In some embodiments, downhole electromagnetic tool 720 is communicatively connected to downhole electromagnetic tool calibration system 102 via a telemetry system (not shown) and is operable to provide data indicative of measurements obtained by downhole electromagnetic tool 720 to downhole electromagnetic tool calibration system 102. In one or more embodiments, an acoustic telemetry system that transmits data via vibrations in the tubing wall of conveyance 716 is deployed in borehole 706 to provide telemetry. More particularly, the vibrations are generated by an acoustic transmitter (not shown) mounted on conveyance 716 and propagate along conveyance 716 to an acoustic receiver (not shown) also mounted on conveyance 716. In one or more embodiments, an electromagnetic wave telemetry system that transmits data using current flows induced in conveyance 716 is deployed in borehole 706 to provide telemetry. Additional types of telemetry systems may also be deployed in borehole 706 to transmit data from downhole electromagnetic tool 720 and other downhole components to downhole electromagnetic tool calibration system 102.

Figure 7B:
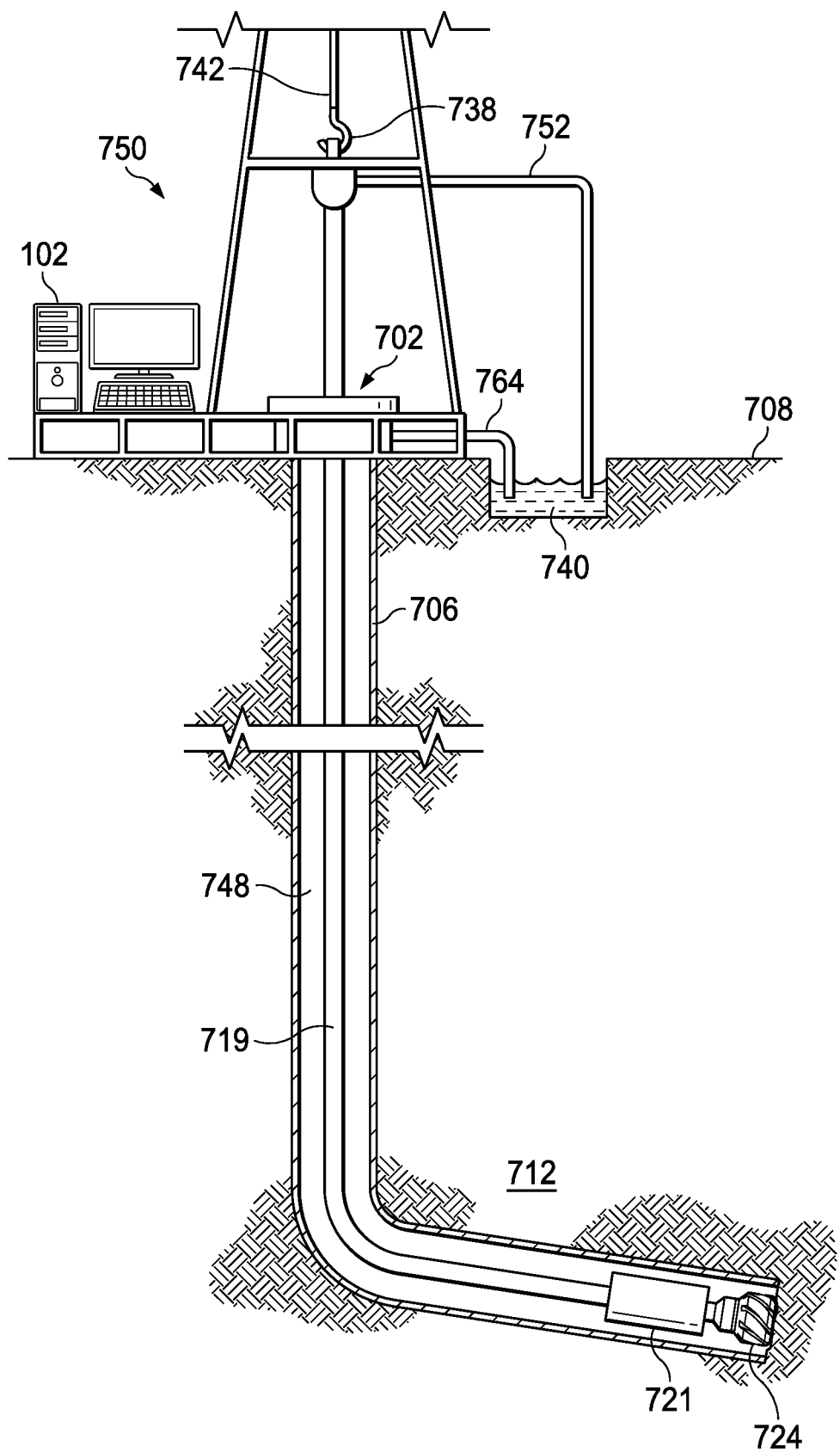
FIG. 7B is a schematic, side view of a logging while drilling (LWD)/measurement while drilling (MWD) environment with another downhole electromagnetic tool deployed to measure the properties of the formation during a drilling operation.

FIG. 7B is a schematic, side view of a LWD/MWD environment 750 with another downhole electromagnetic tool 721 similar or identical to downhole electromagnetic tool 104 of FIG. 1 and deployed to measure the properties of formation 712 during a drilling operation. FIG. 7B may also represent another completion or preparation environment where a drilling operation is performed. A hook 738, cable 742, traveling block (not shown), and hoist (not shown) are provided to lower a drill sting 719 down borehole 706 or to lift conveyance 719 up from borehole 706.

At wellhead 736, an inlet conduit 752 is coupled to a fluid source (not shown) to provide fluids, such as drilling fluids, downhole. Drill string 719 has an internal cavity that provides a fluid flow path from surface 708 down to downhole electromagnetic tool 721. In some embodiments, the fluids travel down drill string 719, through downhole electromagnetic tool 721, and exit drill string 719 at a drill bit 724. The fluids flow back towards surface 708 through a wellbore annulus 748 and exit wellbore annulus 748 via an outlet conduit 764 where the fluids are captured in container 740.

Although FIGS. 7A and 7B each illustrates a single downhole electromagnetic tool 720 or 721 deployed in borehole 706, multiple downhole electromagnetic tools, such as downhole electromagnetic tools 720 and 721 may be simultaneously deployed in borehole 706 to perform operations described herein. Further, although FIGS. 7A and 7B illustrate a surface based downhole electromagnetic tool calibration system 102, in some embodiments, downhole electromagnetic tool calibration system 102 is deployed downhole or at a remote location. Further, in some embodiments, some or all of the operations described herein and illustrated in FIGS. 3-6 are performed by downhole components or devices, such as by processors of downhole electromagnetic tools 720 and 721.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a computer-implemented method to configure a downhole electromagnetic tool, the method comprising: obtaining a first calibration measurement of a first tool configuration of a downhole electromagnetic tool having a transmitter and a receiver; obtaining a second calibration measurement of a second tool configuration of the downhole electromagnetic tool; determining a first ratio of the first calibration measurement to the second calibration measurement; obtaining a first synthetic response of the first tool configuration from a first model of the downhole electromagnetic tool; obtaining a second synthetic response of the second tool configuration from a second model of the downhole electromagnetic tool; determining a second ratio of the first synthetic response to the second synthetic response; and determining a scaling factor between the first tool configuration and the second tool configuration of the downhole electromagnetic tool based on the first ratio and the second ratio.

Clause 2, the computer-implemented method of clause 1, wherein obtaining the first calibration measurement comprises obtaining the first calibration measurement while the downhole electromagnetic tool is operating in a first environment, and wherein obtaining the second calibration measurement comprises obtaining the second calibration measurement while the downhole electromagnetic tool is operating in a second environment.

Clause 3, the computer-implemented method of clause 2, wherein obtaining the first calibration measurement while the downhole electromagnetic tool is operating in the first environment comprises obtaining the first calibration measurement while the downhole electromagnetic tool is operating in a gaseous environment, and wherein obtaining the second calibration measurement in the second environment comprises obtaining the second calibration measurement while the downhole electromagnetic tool is operating in a liquid environment.

Clause 4, the computer-implemented method of clause 1, wherein obtaining the first calibration measurement comprises obtaining the first calibration measurement while the downhole electromagnetic tool is operating at a first frequency, and wherein obtaining the second calibration measurement comprises obtaining the second calibration measurement while the downhole electromagnetic tool is operating at a second frequency that is different from the first frequency.

Clause 5, the computer-implemented method of clause 4, wherein obtaining the first calibration measurement comprises obtaining the first calibration measurement while the downhole electromagnetic tool is operating in a gaseous environment, and wherein obtaining the second calibration measurement comprises obtaining the second calibration measurement while the downhole electromagnetic tool is operating in the gaseous environment.

Clause 6, the computer-implemented method of clause 4, wherein obtaining the first calibration measurement comprises obtaining the first calibration measurement while the downhole electromagnetic tool is operating in a liquid environment, and wherein obtaining the second calibration measurement comprises obtaining the second calibration measurement while the downhole electromagnetic tool is operating in the liquid environment.

Clause 7, the computer-implemented method of clause 1, wherein the downhole electromagnetic tool comprises a second receiver, wherein obtaining the first tool configuration of the downhole electromagnetic tool comprises obtaining a tool configuration of the transmitter and the receiver, and wherein obtaining the second tool configuration of the downhole electromagnetic tool comprises obtaining a tool configuration of the transmitter and the second receiver.

Clause 8, the computer-implemented method of clause 7, wherein obtaining the first tool configuration of the downhole electromagnetic tool and obtaining the second tool configuration of the downhole electromagnetic tool comprises obtaining the first tool configuration of the downhole electromagnetic tool and obtaining the second tool configuration of the downhole electromagnetic tool while the downhole electromagnetic tool is operating in one environment.

Clause 9, the computer-implemented method of clause 1, further comprising calibrating a measurement made by the transmitter and the receiver based on the scaling factor.

Clause 10, a downhole electromagnetic tool calibration system, comprising: a storage system; and one or more processors configured to: obtain a first calibration measurement of a first tool configuration of a downhole electromagnetic tool having a transmitter and a receiver; obtain a second calibration measurement of a second tool configuration of the downhole electromagnetic tool; determine a first ratio of the first calibration measurement to the second calibration measurement; obtain a first synthetic response of the first tool configuration from a first model of the downhole electromagnetic tool; obtain a second synthetic response of the second tool configuration from a second model of the downhole electromagnetic tool; determine a second ratio of the first synthetic response and the second synthetic response; determine a scaling factor of the downhole electromagnetic tool based on the first ratio and the second ratio; and calibrate a measurement made by the transmitter and the receiver based on the scaling factor.

Clause 11, the downhole electromagnetic tool calibration system of clause 10, wherein the one or more processors are further operable to: obtain the first calibration measurement while the downhole electromagnetic tool is operating in a first environment; and obtain the second calibration measurement while the downhole electromagnetic tool is operating in a second environment.

Clause 12, the downhole electromagnetic tool calibration system of clause 11, wherein the first model comprises electrical properties of the first environment to produce the first synthetic response from the downhole electromagnetic tool, and wherein the second model comprises electrical properties of the second environment to produce the second synthetic response from the downhole electromagnetic tool.

Clause 13, the downhole electromagnetic tool calibration system of clause 12, wherein the first tool configuration and the second tool configuration have an identical configuration, and wherein the first environment and the second environment have different electrical properties.

Clause 14, the downhole electromagnetic tool calibration system of clause 13, wherein the first model is a model of the downhole electromagnetic tool while the downhole electromagnetic tool is operating in the first environment, and wherein the second model is a model of the downhole electromagnetic tool while the downhole electromagnetic tool is operating in the second environment.

Clause 15, the downhole electromagnetic tool calibration system of clause 10, wherein the one or more processors are further operable to: obtain the first calibration measurement while the downhole electromagnetic tool is operating at a first frequency; and obtain the second calibration measurement while the downhole electromagnetic tool is operating at a second frequency that is different from the first frequency.

Clause 16, the downhole electromagnetic tool calibration system of clause 15, wherein the one or more processors are further operable to obtain the first calibration measurement and the second calibration measurement while the downhole electromagnetic tool is operating in one environment.

Clause 17, the downhole electromagnetic tool calibration system of clause 15, wherein the first model is a model of the downhole electromagnetic tool while the downhole electromagnetic tool is operating at the first frequency, and wherein the second model is a model of the downhole electromagnetic tool while the downhole electromagnetic tool is operating at the second frequency.

Clause 18, the downhole electromagnetic tool calibration system of clause 10, wherein the first model and the second model are one of a dipole model, a coil model, and a three-dimensional antenna geometry model of the downhole electromagnetic tool.

Clause 19, A non-transitory machine-readable medium comprising instructions stored therein, which when executed by one or more processors, cause the one or more processors to perform operations comprising: obtaining a first calibration measurement of a first tool configuration of a downhole electromagnetic tool having a transmitter and a receiver; obtaining a second calibration measurement of a second tool configuration of the downhole electromagnetic tool; determining a first ratio of the first calibration measurement to the second calibration measurement; obtaining a first synthetic response of the first tool configuration from a first model of the downhole electromagnetic tool; obtaining a second synthetic response of the second tool configuration from a second model of the downhole electromagnetic tool; determining a second ratio of the first synthetic response to the second synthetic response; and determining a scaling factor between the first tool configuration and the second tool configuration of the downhole electromagnetic tool based on the first ratio and the second ratio.

Clause 20, the non-transitory machine-readable medium of clause 19, wherein the instructions when executed by one or more processors, cause the one or more processors to perform operations comprising calibrating a measurement made by the transmitter and the receiver based on the scaling factor.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an," and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof

What is claimed:

1. A computer-implemented method to configure a downhole electromagnetic tool, the method comprising:
   obtaining a first calibration measurement of a first tool configuration of a downhole electromagnetic tool having a transmitter and a receiver, wherein first calibration measurement is obtained while the downhole electromagnetic tool is operating in a first gaseous environment;
   obtaining a second calibration measurement of a second tool configuration of the downhole electromagnetic tool, wherein the second calibration measurement is obtained while the downhole electromagnetic tool is operating in a second gaseous environment or a liquid environment;
   determining a first ratio of the first calibration measurement to the second calibration measurement;
   obtaining a first synthetic response of the first tool configuration from a first model of the downhole electromagnetic tool;
   obtaining a second synthetic response of the second tool configuration from a second model of the downhole electromagnetic tool;
   determining a second ratio of the first synthetic response to the second synthetic response; and
   determining a scaling factor between the first tool configuration and the second tool configuration of the downhole electromagnetic tool based on the first ratio and the second ratio.

2. The computer-implemented method of claim 1, wherein obtaining the first calibration measurement comprises obtaining the first calibration measurement while the downhole electromagnetic tool is operating at a first frequency, and wherein obtaining the second calibration measurement comprises obtaining the second calibration measurement while the downhole electromagnetic tool is operating at a second frequency that is different from the first frequency.

3. The computer-implemented method of claim 1, wherein the downhole electromagnetic tool comprises a second receiver, wherein obtaining the first tool configuration of the downhole electromagnetic tool comprises obtaining a tool configuration of the transmitter and the receiver, and wherein obtaining the second tool configuration of the downhole electromagnetic tool comprises obtaining a tool configuration of the transmitter and the second receiver.

4. The computer-implemented method of claim 3, wherein obtaining the first tool configuration of the downhole electromagnetic tool and obtaining the second tool configuration of the downhole electromagnetic tool comprise obtaining the first tool configuration of the downhole electromagnetic tool and obtaining the second tool configuration of the downhole electromagnetic tool while the downhole electromagnetic tool is operating in one environment.

5. The computer-implemented method of claim 1, further comprising calibrating a measurement made by the transmitter and the receiver based on the scaling factor.

6. A downhole electromagnetic tool calibration system, comprising:
   a storage system; and
   one or more processors configured to:
      obtain a first calibration measurement of a first tool configuration of a downhole electromagnetic tool having a transmitter and a receiver, wherein first calibration measurement is obtained while the downhole electromagnetic tool is operating in a first gaseous environment;
      obtain a second calibration measurement of a second tool configuration of the downhole electromagnetic tool, wherein the second calibration measurement is obtained while the downhole electromagnetic tool is operating in a second gaseous environment or a liquid environment;
      determine a first ratio of the first calibration measurement to the second calibration measurement;
      obtain a first synthetic response of the first tool configuration from a first model of the downhole electromagnetic tool;

obtain a second synthetic response of the second tool configuration from a second model of the downhole electromagnetic tool;

determine a second ratio of the first synthetic response and the second synthetic response;

determine a scaling factor of the downhole electromagnetic tool based on the first ratio and the second ratio; and calibrate a measurement made by the transmitter and the receiver based on the scaling factor.

7. The downhole electromagnetic tool calibration system of claim 6, wherein the first model comprises electrical properties of the first environment to produce the first synthetic response from the downhole electromagnetic tool, and wherein the second model comprises electrical properties of the second environment to produce the second synthetic response from the downhole electromagnetic tool.

8. The downhole electromagnetic tool calibration system of claim 7, wherein the first tool configuration and the second tool configuration have an identical configuration, and wherein the first environment and the second environment have different electrical properties.

9. The downhole electromagnetic tool calibration system of claim 8, wherein the first model is a model of the downhole electromagnetic tool while the downhole electromagnetic tool is operating in the first environment, and wherein the second model is a model of the downhole electromagnetic tool while the downhole electromagnetic tool is operating in the second environment.

10. The downhole electromagnetic tool calibration system of claim 6, wherein the one or more processors are further operable to:

obtain the first calibration measurement while the downhole electromagnetic tool is operating at a first frequency; and obtain the second calibration measurement while the downhole electromagnetic tool is operating at a second frequency that is different from the first frequency.

11. The downhole electromagnetic tool calibration system of claim 10, wherein the one or more processors are further operable to obtain the first calibration measurement and the second calibration measurement while the downhole electromagnetic tool is operating in one environment.

12. The downhole electromagnetic tool calibration system of claim 10, wherein the first model is a model of the downhole electromagnetic tool while the downhole electromagnetic tool is operating at the first frequency, and wherein the second model is a model of the downhole electromagnetic tool while the downhole electromagnetic tool is operating at the second frequency.

13. The downhole electromagnetic tool calibration system of claim 6, wherein the first model and the second model are one of a dipole model, a coil model, and a three-dimensional antenna geometry model of the downhole electromagnetic tool.

14. A non-transitory machine-readable medium comprising instructions stored therein, which when executed by one or more processors, cause the one or more processors to perform operations comprising:

obtaining a first calibration measurement of a first tool configuration of a downhole electromagnetic tool having a transmitter and a receiver, wherein first calibration measurement is obtained while the downhole electromagnetic tool is operating in a first gaseous environment;

obtaining a second calibration measurement of a second tool configuration of the downhole electromagnetic tool, wherein the second calibration measurement is obtained while the downhole electromagnetic tool is operating in a second gaseous environment or a liquid environment;

determining a first ratio of the first calibration measurement to the second calibration measurement;

obtaining a first synthetic response of the first tool configuration from a first model of the downhole electromagnetic tool;

obtaining a second synthetic response of the second tool configuration from a second model of the downhole electromagnetic tool;

determining a second ratio of the first synthetic response to the second synthetic response; and determining a scaling factor between the first tool configuration and the second tool configuration of the downhole electromagnetic tool based on the first ratio and the second ratio, wherein the first calibration, the second calibration, the first ratio, and the second ratio are determined on a surface.

15. The non-transitory machine-readable medium of claim 14, wherein the instructions when executed by one or more processors, cause the one or more processors to perform operations comprising calibrating a measurement made by the transmitter and the receiver based on the scaling factor.

* * * * *